United States Patent
Godet et al.

(10) Patent No.: US 11,885,867 B2
(45) Date of Patent: Jan. 30, 2024

(54) METHOD FOR DETERMINING THE DISTANCE BETWEEN AN AUTHENTICATION DEVICE AND A VEHICLE

(71) Applicants: Continental Automotive France, Toulouse (FR); Continental Automotive GmbH, Hannover (DE)

(72) Inventors: Sylvain Godet, Toulouse (FR); Martin Opitz, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 449 days.

(21) Appl. No.: 17/293,244

(22) PCT Filed: Dec. 10, 2019

(86) PCT No.: PCT/EP2019/084448
§ 371 (c)(1),
(2) Date: May 12, 2021

(87) PCT Pub. No.: WO2020/120483
PCT Pub. Date: Jun. 18, 2020

(65) Prior Publication Data
US 2022/0050192 A1    Feb. 17, 2022

(30) Foreign Application Priority Data
Dec. 11, 2018 (FR) ...................... 1872716

(51) Int. Cl.
*G01S 11/06* (2006.01)
*B60R 25/24* (2013.01)

(52) U.S. Cl.
CPC ............ *G01S 11/06* (2013.01); *B60R 25/245* (2013.01); *B60R 2325/101* (2013.01); *B60R 2325/205* (2013.01)

(58) Field of Classification Search
CPC ............................... G01S 11/06; B60R 25/245
(Continued)

(56) References Cited

U.S. PATENT DOCUMENTS

| 7,130,601 B2 | 10/2006 | Khorram |
| 2009/0011725 A1 | 1/2009 | Kato |

(Continued)

FOREIGN PATENT DOCUMENTS

| CN | 106062511 A | * 10/2016 | ........... G01C 15/002 |
| EP | 2682780 A1 | * 1/2014 | ........... G01S 17/026 |

OTHER PUBLICATIONS

English Translation of the Written Opinion for International Application No. PCT/EP2019/084448, dated Feb. 11, 2020, 7 pages.
(Continued)

*Primary Examiner* — Harry K Liu
(74) *Attorney, Agent, or Firm* — RatnerPrestia (57) ABSTRACT

A method for determining the distance between an authentication device carried by a user and a motor vehicle, each including a wireless communication module so as to exchange a data frame, the data frame being modulated by changing the phase of a reference signal. The method includes the following steps of: the vehicle receiving a modulated reference signal, sent by the device, demodulating the received signal in order to extract an in-phase component and a quadrature component therefrom, computing the power value of the signal on the basis of the maximum amplitude value of the in-phase component and of the maximum amplitude value of the quadrature component, and determining the distance between the device and the vehicle on the basis of the computed power value.

11 Claims, 3 Drawing Sheets

(58) Field of Classification Search
USPC ......................................................... 342/458
See application file for complete search history.

(56) References Cited

U.S. PATENT DOCUMENTS

| | | |
|---|---|---|
| 2015/0048927 A1 | 2/2015 | Simmons |
| 2018/0099643 A1* | 4/2018 | Golsch ................. G01S 13/765 |
| 2018/0254925 A1 | 9/2018 | Dutz et al. |
| 2018/0302859 A1* | 10/2018 | Elangovan .............. H04W 4/40 |
| 2023/0300017 A1* | 9/2023 | Newman ............. H04L 27/2691 |
| | | 714/726 |

OTHER PUBLICATIONS

International Search Report and Written Opinion for International Application No. PCT/EP2019/084448, dated Feb. 11, 2020, with partial English translation, 8 pages.

International Search Report and Written Opinion for International Application No. PCT/EP2019/084448, dated Feb. 11, 2020, 13 pages (French).

* cited by examiner

METHOD FOR DETERMINING THE DISTANCE BETWEEN AN AUTHENTICATION DEVICE AND A VEHICLE

CROSS REFERENCE TO RELATED APPLICATIONS

This application is the U.S. National Phase Application of PCT International Application No. PCT/EP2019/084448, filed Dec. 10, 2019, which claims priority to French Patent Application No. 1872716, filed Dec. 11, 2018, the contents of such applications being incorporated by reference herein.

FIELD OF THE INVENTION

The invention relates to the detection of an authentication device in the vicinity of a vehicle and, more specifically, it relates to a method and to a computer allowing the distance between an authentication device and a vehicle to be determined in order to activate functions of the vehicle.

BACKGROUND OF THE INVENTION

Nowadays, some motor vehicles are equipped with a detection system allowing a device, for example, a fob or an electronic ignition key, carried by the user to be authenticated remotely in order to implement certain functions from outside the vehicle. For example, such a detection system can be used in order to implement a function for unlocking the openings of the vehicle, for example, the doors or the trunk or even for activating welcome functions (lights, adjustments of internal equipment, etc.).

For security reasons, it is known for the system to be configured in order to activate these functions only when the user is located at a distance that is less than a predetermined distance, called "detection distance", which depends on the function to be activated. For example, the function for unlocking the openings can only be activated when the user is located less than two meters from the vehicle. As a further example, welcome lighting can be activated when the user is located less than five meters from the vehicle or a request to move the vehicle ("remote parking") can only be activated when the user is located less than six meters from the vehicle.

In a known solution, the vehicle and the device communicate over wireless communication links of the LF/RF (Low Frequency/Radio Frequency) type. In this solution, the vehicle periodically transmits a detection signal over an LF communication link. When the device receives this detection signal, it responds to the vehicle over an RF communication link in order to authenticate itself. The advantage of this type of technology is that the propagation of the signals is not affected by mechanical elements, such as the bodywork of the vehicle. In order to determine the distance between the user and the vehicle, the vehicle measures the power of the signals received from the authentication device during these exchanges and deduces a distance therefrom.

For practical reasons, it is currently known for a smartphone to be used, for example, that of the driver, in order for them to be authenticated near the vehicle. However, the smartphones that are currently used for the most part do not have an LF/RF communication interface. In order to overcome this disadvantage, it is known for a Bluetooth® communication interface to be used, in particular an interface of the BLE (Bluetooth® Low Energy) type that is present on most current smartphones. The exchanges are carried out over such an interface using encoded frames in a signal called BLE signal.

In order to determine the distance between the device and the vehicle, the vehicle must detect the reception of a BLE signal and determine the power thereof, for example, by measuring the RSSI (Received Signal Strength Indication), in order to deduce the distance therefrom. However, it has been noted that measuring the RSSI is not reliable insofar as the signals can bounce off surrounding objects, resulting in inaccurate distance determination.

In a known solution, measuring the RSSI over a longer duration, of the order of 10 seconds, and determining the median of these measurements has been proposed in order to obtain a more reliable RSSI value. However, with the user generally continuously moving as they approach the vehicle, the distance that is determined at the end of such a measurement duration is not the distance to the point where the user is actually located, which presents a significant disadvantage.

SUMMARY OF THE INVENTION

Therefore, an aspect of the invention is to at least partly overcome these disadvantages by proposing a simple, reliable and effective solution for determining the distance between the device and the vehicle.

To this end, an aspect of the invention is a method for determining the distance between an authentication device intended to be carried by a user and a motor vehicle, said device and said vehicle each comprising a wireless communication module allowing at least one data frame to be exchanged between the communication module, denoted transmitter, of the device and the communication module, denoted receiver, of the vehicle, said data frame comprising a series of bits with a value of 0 or 1 modulated by the transmitter by changing the phase of a reference signal comprising a component, called "in-phase" component, characterized by a maximum amplitude value, and a second component, called "quadrature" component, phase-shifted by 90° in relation to the in-phase component and characterized by a maximum amplitude value, said method comprising a step of the receiver receiving a modulated reference signal, which signal is sent by the transmitter and the phase changes of which characterize the values of the bits of a data frame, and a step of demodulating the received reference signal in order to extract the in-phase component and the quadrature component therefrom, the method being characterized in that it further comprises, following the demodulating step, a step of computing the power value of the reference signal on the basis of the maximum amplitude value of the in-phase component and of the maximum amplitude value of the quadrature component and a step of determining the distance between the transmitter and the receiver on the basis of the computed power value.

The use of the in-phase component and of the quadrature component allows the power of the received signal to be precisely, quickly and reliably computed compared to a measurement of the RSSI of said signal. Furthermore, the computation of the power of the signal, and therefore of the distance, is advantageously rendered precise and quick by using a series of consecutive 0s or 1s in the data frame sent in the signal, insofar as the reduction in the number of alternations of the states of the bits (from 0 to 1 or from 1 to 0) reduces the disruptions on the signal and therefore renders the estimation of the power more precise.

Preferably, the power value of the reference signal is computed using the following formula:

$$P_{dBm}=10*\log(10*(I_M^2+Q_M^2))$$ [Math. 1], where $P_{dBm}$ is the power of the reference signal in dBm, $I_M$ is the maximum amplitude value of the in-phase component and $Q_M$ is the maximum amplitude value of the quadrature component. Thus, the power of the signal is computed precisely, increasing the reliability of the determination of the distance.

Advantageously, with the data frame comprising a useful data field, the received data frame is specific and the useful data field is either composed of a series of 0s or of a series of 1s, in order to limit disparities due to the alternation of 0 and of 1.

Advantageously, the method further comprises, prior to the step of the receiver receiving the modulated reference signal, a step of the transmitter modulating the reference signal on the basis of the signals corresponding to the bits of the useful data field of the data frame and a step of transmitting the modulated reference signal to the receiver.

Preferably, the method comprises:
  prior to the step of modulating the reference signal, a step of transforming the reference signal in order to avoid sending a series of 0s or of 1s in the useful data field of the data frame; and
  prior to said transformation step, a step of reverse transformation of the bits of the useful data field in order to allow modulation of a series of 0s or of 1s in the useful data field of the data frame.

Thus, a useful data field comprising a series of 0s or of 1s is transmitted despite the transformation of the bits by the transmitter communication module.

Preferably, the data frames are encoded in signals exchanged in the UHF (Ultra High Frequency) band ranging between 300 and 3000 MHz, more preferably according to the BLE (Bluetooth® Low Energy) standard.

Preferably, with the communication modules being configured to exchange data frames over different channels, said data frame comprises an identifier for identifying said channel over which the data frame is transmitted, in order to determine the channel by which the data frame was received.

A further aspect of the invention is a computer intended to be mounted in a motor vehicle in order to determine the distance between an authentication device intended to be carried by a user and said vehicle, said device and said vehicle each comprising a wireless communication module allowing at least one data frame to be exchanged between the communication module, denoted transmitter, of the device and the communication module, denoted receiver, of the vehicle, said data frame comprising a series of bits with a value of 0 or 1 modulated by the transmitter by changing the phase of a reference signal comprising a component, called "in-phase" component, characterized by a maximum amplitude value, and a second component, called "quadrature" component, phase-shifted by 90° in relation to the in-phase component and characterized by a maximum amplitude value, the receiver being configured to receive a modulated reference signal, which signal is sent by the transmitter and the phase changes of which characterize the values of the bits of a data frame, and to demodulate the received reference signal in order to extract the in-phase component and the quadrature component therefrom, the computer being characterized in that it is configured to compute the power value of the reference signal on the basis of the maximum amplitude value of the in-phase component and of the maximum amplitude value of the quadrature component and to determine the distance between the transmitter and the receiver on the basis of the computed power value.

Preferably, the power value of the reference signal is computed using the following formula:

$$P_{dBm}=10*\log(10*(I_M^2+Q_M^2))$$ [Math. 2], where $P_{dBm}$ is the power of the reference signal in dBm, $I_M$ is the maximum amplitude value of the in-phase component and $Q_M$ is the maximum amplitude value of the quadrature component.

Advantageously, with the data frame comprising a useful data field, the received data frame is specific and the useful data field is either composed of a series of 0s or of a series of 1s.

An aspect of the invention also relates to a motor vehicle comprising:
  a communication module, called receiver, configured to receive a modulated reference signal, which is sent by the transmitter and for which the phase changes characterize the values of the bits of a data frame, and to demodulate the received reference signal in order to extract the in-phase component and the quadrature component therefrom; and
  a computer, as previously described.

An aspect of the invention further relates to an authentication device intended to be carried by a user, comprising a communication module, called transmitter, configured to:
  transform a reference signal in order to avoid sending a series of 0s or of 1s in the useful data field of a data frame; and
  carry out reverse transformation of the bits of the useful data field in order to allow modulation of a series of 0s or of 1s in the useful data field of the data frame;
  modulate a reference signal on the basis of the signals corresponding to the bits of the useful data field of the data frame and transmit the modulated reference signal.

A further aspect of the invention is a detection system for a motor vehicle, said system comprising:
  an authentication device intended to be carried by a user, comprising a communication module, called transmitter, configured to modulate the reference signal on the basis of the signals corresponding to the bits of the useful data field of a data frame and to transmit the modulated reference signal; and
  a motor vehicle as described above.

BRIEF DESCRIPTION OF THE DRAWINGS

Further features and advantages of aspects of the invention will become apparent from the following description, which is provided with reference to the appended figures, which are provided by way of non-limiting examples and in which identical reference signs are assigned to similar objects.

DETAILED DESCRIPTION OF THE PREFERRED EMBODIMENTS

An aspect of the invention will be presented hereafter in view of implementation in a motor vehicle. However, any implementation in a different context, in particular for any vehicle, is also covered by an aspect of the present invention.

Figure 1:
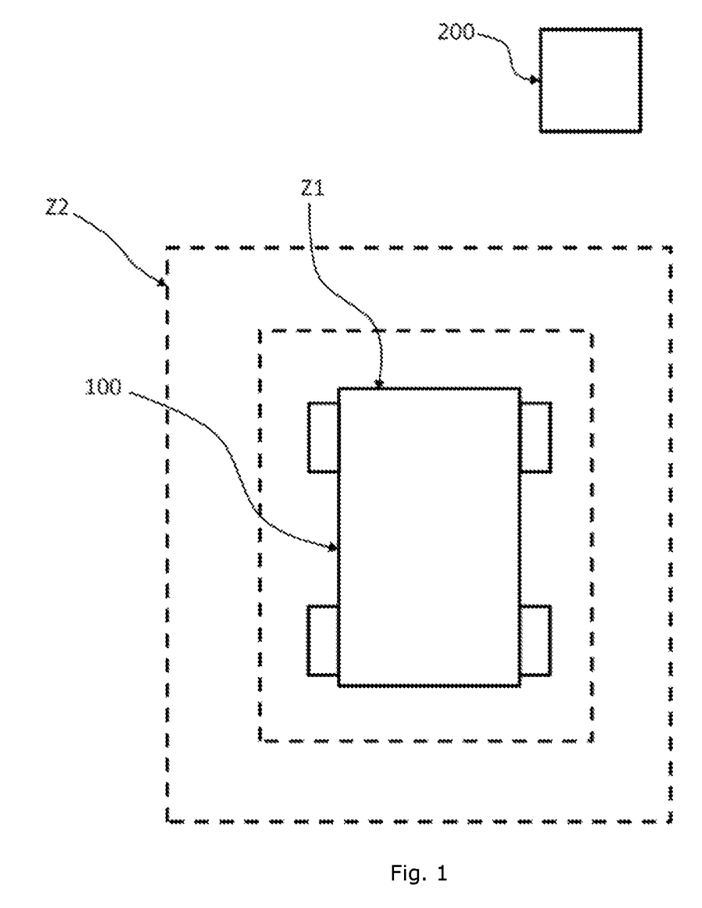
FIG. 1 schematically illustrates a motor vehicle, around which different action zones are defined.

As illustrated in FIG. 1, different zones Z1, Z2 are determined around a motor vehicle 100. The vehicle 100 is configured to determine the distance between a user and the vehicle 100, in order to authenticate the user for implementing certain functions from outside said vehicle 100.

In the example illustrated in FIG. 1, a first zone Z1 allows a function for unlocking the vehicle 100 to be activated when the user is located less than two meters from the vehicle 100. A second zone Z2 allows welcome lighting to be activated when the user is located less than five meters from the vehicle 100. Other zones can be determined around the vehicle 100 in order to activate other functions, in particular a request to move the vehicle ("remote parking") when the user is located less than six meters from the vehicle 100.

According to an aspect of the invention, the distance is determined from an authentication device 200 that the user carries in order to determine the distance from the user to the vehicle 100 on the basis of the distance from the authentication device 200 to the vehicle 100. To this end, the authentication device 200 and the vehicle 100 exchange at least one data frame in the form of a signal, as will be described hereafter.

The authentication device 200 can be in the form of a mobile terminal, such as a smartphone, or even in the form of a remote control, for example. Such a device 200 is thus easy for the user to carry such that they carry it with them when the distance to the vehicle 100 is determined.

The authentication device 200 comprises a wireless communication module (not shown) adapted to communicate with the vehicle 100 in order to exchange at least one data frame. In particular, the device 200 is configured to send a data frame T.

The communication module is of the Bluetooth® type, preferably Bluetooth® Low Energy, denoted BLE. Such a communication module is configured to transmit a data frame over different channels: in particular over a first channel, the frequency of which is 2402 MHz, a second channel, the frequency of which is 2426 MHz, and a third channel, the frequency of which is 2480 MHz. Conventionally, the communication module simultaneously transmits a data frame over these different channels. One of the aims of an aspect of the invention is to determine, when a data frame is received, the channel through which it was transmitted.

A data frame comprises an identifier field and at least one useful data field that corresponds to the data that the authentication device 200 wishes to send to the vehicle 100. The identifier allows the channel by which the data frame was transmitted to be identified.

According to a preferred embodiment, a data frame is in the form of a plurality of bits, with each of the fields being composed of a series of 0s or of 1s grouped into bytes. By way of an example, a BLE type data frame is composed as follows: 1 to 2 bytes for the preamble, 4 bytes for the identifier (or Access Address), 2 to 257 bytes for the useful part (called Protocol Data Unit or PDU) and 3 bytes for the error detection (CRC).

According to one aspect of the invention, the device 200 comprises a modulation unit (not shown) configured to modulate a reference signal by changing the phase of this reference signal. The phase changes of this modulated signal S are features of the values of the various bits of the data frame. The modulated reference signal S comprises a component, called "in-phase" component I and a component, called "quadrature" component Q, phase-shifted by 90° in relation to the in-phase component I. Each of the components I, Q is characterized by a maximum amplitude value IM, QM. Since such a modulation of the quadrature amplitude modulation type is known, it will not be described in further detail.

The device 200 is also configured to transform the reference signal so as to force the transmission of a series that is only composed of 0s or 1s in the useful data field. Indeed, in some cases, the communication module can be configured to avoid sending a series of bits composed only of 0s or only of 1s using a filter for jamming bits before the transmission of a signal, with said signal being filtered in reverse on reception in order to recover the original bits of the message. In this case, the device can be configured to apply the reverse jamming filter to the useful data bits before transmitting them to the communication module, so that the communication module transforms them, via the jamming filter, into a series composed only of 0s or only of 1s. The use of a frame in which the useful data field is filled with only 0s or only 1s allows the disruptions in the signal S to be limited that are generated by the alternations of 0s and of 1s and to thus optimize the subsequent measurements carried out on the signal S.

Figure 2:
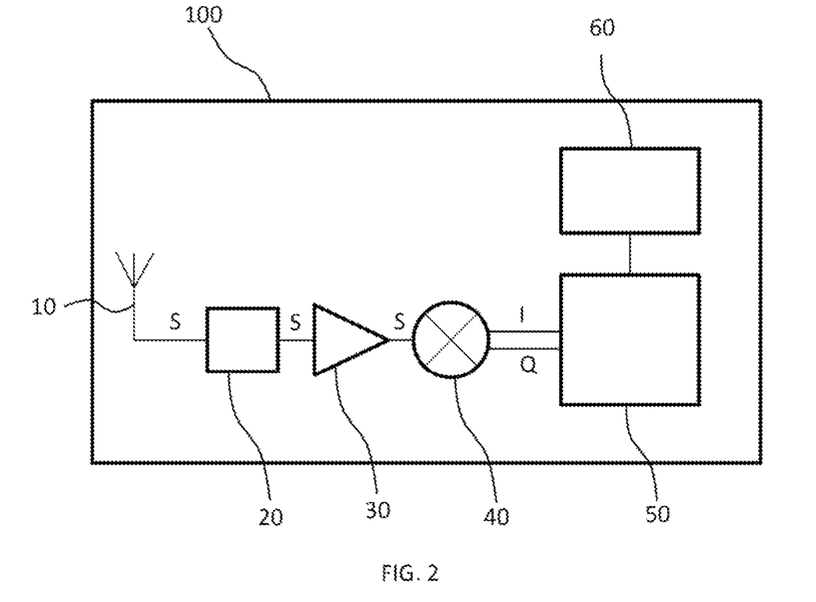
FIG. 2 schematically illustrates an embodiment of a motor vehicle according to an aspect of the invention.

In the example illustrated in FIG. 2, the motor vehicle 100 comprises an antenna 10, a filter 20, an amplifier 30, a demodulation unit 40, a communication module 50 and a computer 60.

The antenna 10 is configured to receive modulated signals S in order to communicate with the authentication device 200 placed at a distance from the vehicle 100.

The filter 20 is configured to filter the received modulated signal S and the amplifier 30 is configured to amplify the modulated signal S. Since such elements are known, they will not be described in further detail.

The demodulation unit 40 is configured to decimate a received modulated signal S in order to separate the modulated signal S into two signals corresponding to each of the components I, Q. In other words, the demodulation unit 40 is configured to extract the components I, Q from the modulated signal S.

Since such demodulation is known, it will not be described in further detail.

Figure 3:
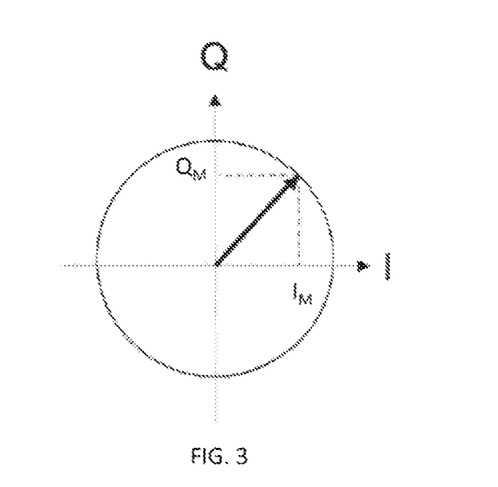
FIG. 3 schematically illustrates a constellation diagram of a signal received by the vehicle of FIG. 2.

For each bit of the received data frame, a maximum amplitude value IM, QM of each component I, Q is thus determined and can be listed on a constellation diagram, as illustrated in FIG. 3.

The computer 60 is configured to determine the distance between the vehicle 100 and the device 200 on the basis of the power $P_{dBm}$ of the modulated signal S received by the vehicle 100.

The voltage $V_{pk}$ of the modulated signal S is provided by the following equation:

$$V_{pk} = \operatorname{sqrt}(I^2 + Q^2) \qquad \text{[Math. 3]}$$

In order to carry out a precise measurement, in other words without distortion, the values of the components I, Q that are used are the maximum amplitude values $I_M$, $Q_M$, which correspond to the peak value of the quadrature sinusoidal components of the modulated signal S. The effective value of the voltage, denoted $V_{rms}$, is thus provided by the following equation:

$$V_{rms} = \frac{V_{pk}}{sqrt(2)} = sqrt\left(\frac{I^2 + Q^2}{2}\right) \qquad \text{[Math. 4]}$$

The power of the modulated signal S is then, for a 50 ohms system, provided by the following equation:

$$P_{rms} = \frac{V_{rms}^2}{50} = \frac{\frac{I_M^2 + Q_M^2}{2}}{50} = \frac{I_M^2 + Q_M^2}{100} \qquad \text{[Math. 5]}$$

or in dBm:

$$P_{dBm} = 10*\log\left(\frac{P_{rms}}{1\,\text{mW}}\right) = 10*\log(10*(I_M^2 + Q_M^2)) \qquad \text{[Math. 6]}$$

The computer 60 is thus configured to compute the power $P_{dBm}$ of the signal S received by the vehicle 100 on the basis of the components I, Q of the signal S. The computer 60 is also configured to determine the distance between the device 200 and the vehicle 100 on the basis of this measured power in a manner per se known.

According to one aspect of the invention, the computer 60 is configured to determine the channel by which the data frame was received from the identifier. This allows the computer 60 to determine the features of this channel, in particular its frequency, in order to optimize the computation of the power of the signal S received by this channel, and thus make the determination of the distance more reliable.

Figure 4:
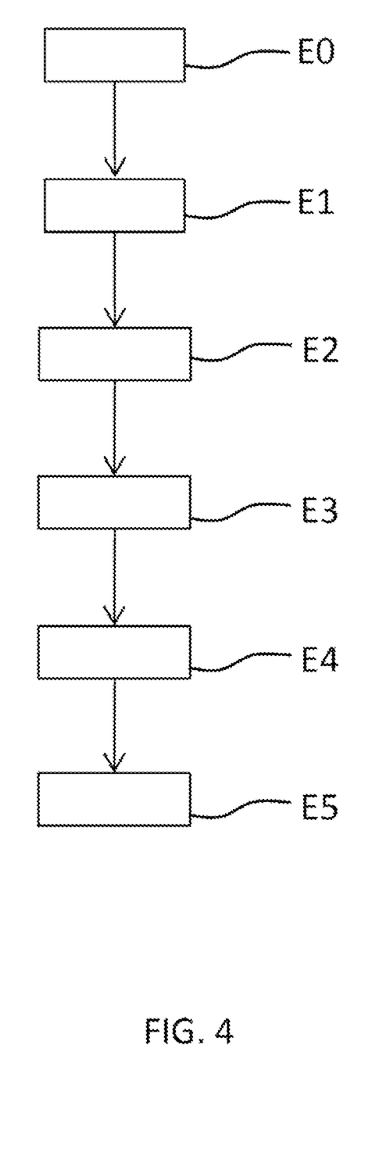
FIG. 4 schematically illustrates an implementation of the method according to an aspect of the invention.

An embodiment of the method according to the invention for determining the distance between the authentication device 200 and the vehicle 100 will now be described.

When the user carries the authentication device 200, said device transmits, in a transmission step E1, a specific data frame in the form of a signal S.

Before transmitting this specific data frame, the device 200 successively carries out a reverse transformation and a transformation of this specific data frame, with said reverse transformation being the reverse of said transformation. The purpose of the reverse transformation is to transform the specific data frame, the useful data field of which comprises a series of 0s or of 1s, alternating from 0 and 1, which, after the transformation, will be transformed again into a series of 0s or of 1s. This allows a specific data frame to be transmitted that comprises a series of 0s or of 1s despite the transformation intended to avoid such a transmission for non-specific data frames.

Still prior to the transmission of the specific data frame, the device 200 modulates, in a step E0, a reference signal S on the basis of the signals corresponding to the bits of the useful data field of the specific data frame.

After the transmission E1, the signal S is received by the vehicle 100 in a reception step E2. In particular, the antenna 10 receives the signal S, which is subsequently filtered by the filter 20 and amplified by the amplifier 30.

Then, in a demodulation step E3, the signal S is demodulated by the demodulation module 40 in order to separate the in-phase signal I and the phase-shifted signal Q.

The computer 60 of the vehicle 100 determines, for each bit, the maximum amplitude value $I_M$ of the in-phase component I and the maximum amplitude value $I_M$ of the quadrature component Q.

In a step E4, the computer 60 computes the power $P_{dBm}$ of the reference signal (S) on the basis of these maximum amplitude values $I_M$, $Q_M$, as previously described.

Then, in a step E5, the computer 60 determines the distance between the device 200 and the vehicle 100 on the basis of the computed power $P_{dBm}$.

Advantageously, a power value $P_{dBm}$ of the signal S can be computed for each bit of the data frame, which allows a plurality of power values $P_{dBm}$ to be computed with a single data frame. The computer 60 thus can compute the median of these values in order to make the distance determination reliable. Furthermore, with the median being carried out with a single data frame, the time required to compute such a median is limited.

In another embodiment, the vehicle 100 can comprise two antennae 10 and a switch, placed between said two antennae and the filter 20, allowing either one of the two antennae 10 to be alternately connected to the filter 20. Advantageously, the switch can switch from one antenna 10 to the other substantially halfway through the duration for receiving a signal corresponding to a BLE data frame, so that the computer 60 can compute, for said frame, a first power value of the signal received on the first antenna 10 and a second power value of the signal received on the second antenna 10, for example, on a different transmission channel, then compute the median or the average in order to further improve the precision of the distance determination.

Therefore, an aspect of the invention allows the power to be computed on the basis of the in-phase and quadrature components of a signal comprising a series of 0s or of 1s in order to precisely determine the distance separating the authentication device 200 from the vehicle 100.

The invention claimed is:

1. A method for determining the distance between an authentication device intended to be carried by a user and a motor vehicle, said device and said vehicle each comprising a wireless communication module allowing at least one data frame to be exchanged between the communication module, denoted transmitter, of the device, and the communication module, denoted receiver, of the vehicle, said data frame comprising a series of bits with a value of 0 or 1 modulated by the transmitter by changing the phase of a reference signal comprising a component, called "in-phase" component, characterized by a maximum amplitude value, and a second component, called "quadrature" component, phase-shifted by 90° in relation to the in-phase component and characterized by a maximum amplitude value, said method comprising:
  a step of the receiver receiving a modulated reference signal, which signal is sent by the transmitter and the phase changes of which characterize the values of the bits of a data frame, and
  a step of demodulating the received reference signal in order to extract the in-phase component and the quadrature component therefrom, the method being characterized in that it further comprises, following the demodulating step,
  a step of computing the power value of the reference signal on the basis of the maximum amplitude value of the in-phase component and of the maximum amplitude value of the quadrature component and
  a step of determining the distance between the transmitter and the receiver on the basis of the computed power value.

2. The method as claimed in claim 1, wherein the power value of the reference signal is computed using the following formula:

$$P_{dBm} = 10*\log(10*(I_M^2 + Q_M^2))$$

where $P_{dBm}$ is the power of the reference signal in dBm, $I_M$ is the maximum amplitude value of the in-phase component and $Q_M$ is the maximum amplitude value of the quadrature component.

3. The method as claimed in claim 1, wherein, with the data frame comprising a useful data field, the received data frame is specific and the useful data field is either composed of a series of 0s or of a series of 1s.

4. The method as claimed in claim 1, further comprising, prior to the step of the receiver receiving the modulated reference signal, a step of the transmitter modulating the reference signal on the basis of the signals corresponding to the bits of the useful data field of the data frame and a step of transmitting the modulated reference signal to the receiver.

5. The method as claimed in claim 4, comprising:
prior to the step of modulating the reference signal, a step of transforming the reference signal in order to avoid sending a series of 0s or of 1s in the useful data field of the data frame; and
prior to said transformation step, a step of reverse transformation of the bits of the useful data field in order to allow modulation of a series of 0s or of 1s in the useful data field of the data frame.

6. The method as claimed in claim 1, wherein the communication module of the device and the communication module of the vehicle are configured to communicate over an interface of the BLE (Bluetooth® Low Energy) type.

7. A computer intended to be mounted in a motor vehicle in order to determine the distance between an authentication device intended to be carried by a user and said vehicle, said device and said vehicle each comprising a wireless communication module allowing at least one data frame to be exchanged between the communication module, denoted transmitter, of the device and the communication module, denoted receiver, of the vehicle, said data frame comprising a series of bits with a value of 0 or 1 modulated by the transmitter by changing the phase of a reference signal comprising a component, called "in-phase" component, characterized by a maximum amplitude value, and a second component, called "quadrature" component, phase-shifted by 90° in relation to the in-phase component and characterized by a maximum amplitude value, the receiver being configured to receive a modulated reference signal, which signal is sent by the transmitter and the phase changes of which characterize the values of the bits of a data frame, and to demodulate the received reference signal in order to extract the in-phase component and the quadrature component therefrom, the computer being configured to compute the power value ($P_{dBm}$) of the reference signal on the basis of the maximum amplitude value of the in-phase component and of the maximum amplitude value of the quadrature component and to determine the distance between the transmitter and the receiver on the basis of the computed power value.

8. The computer as claimed in claim 7, wherein the power value of the reference signal is computed using the following formula:

$$P_{dBm}=10*\log(10*(I_M^2+Q_M^2))$$

where $P_{dBm}$ is the power of the reference signal in dBm, $I_M$ is the maximum amplitude value of the in-phase component and $Q_M$ is the maximum amplitude value of the quadrature component.

9. A motor vehicle comprising:
a communication module, configured to receive a modulated reference signal, which is sent by a transmitter and for which phase changes characterize the values of the bits of a data frame, and to demodulate the received reference signal in order to extract an in-phase component and a quadrature component therefrom; and
a computer as claimed in claim 7.

10. A detection system for a motor vehicle, said system comprising:
an authentication device intended to be carried by a user, comprising a transmitter configured to modulate the reference signal on the basis of the signals corresponding to the bits of the useful data field of the data frame and to transmit the modulated reference signal; and
a motor vehicle as claimed in claim 9.

11. A motor vehicle comprising:
a communication module configured to receive a modulated reference signal, which is sent by a transmitter and for which the phase changes characterize values of the bits of a data frame, and to demodulate the received reference signal in order to extract an in-phase component and a quadrature component therefrom; and
a computer as claimed in claim 8.

* * * * *

UNITED STATES PATENT AND TRADEMARK OFFICE
CERTIFICATE OF CORRECTION

PATENT NO. : 11,885,867 B2
APPLICATION NO. : 17/293244
DATED : January 30, 2024
INVENTOR(S) : Sylvain Godet and Martin Opitz It is certified that error appears in the above-identified patent and that said Letters Patent is hereby corrected as shown below:

In the Claims

Column 10, Line 19, Claim 9: change "module," to --module--.

Signed and Sealed this
Twenty-sixth Day of November, 2024

Katherine Kelly Vidal
*Director of the United States Patent and Trademark Office*